United States Patent
Hara et al.

[11] Patent Number: 5,683,059
[45] Date of Patent: Nov. 4, 1997

[54] BOBBIN FOR SUPERCONDUCTING COILS

[75] Inventors: Tsukushi Hara; Masahiko Nakade; Takeshi Ohkuma, all of Tokyo-to; Kenji Tasaki, Kawasaki; Takashi Yazawa, Kawasaki; Hideaki Maeda, Kawasaki; Eriko Yoneda, Kawasaki; Shunji Nomura, Kawasaki; Toshihiro Kashima; Atsuhiko Yamanaka, both of Otsu, all of Japan

[73] Assignees: Toyo Boseki Kabushiki Kaisha, Osaka; Tokyo Electric Power Co., Ltd.; Toshiba Corporation, both of Tokyo-to, all of Japan

[21] Appl. No.: 631,160

[22] Filed: Apr. 12, 1996

[30] Foreign Application Priority Data

Apr. 24, 1995 [JP] Japan ................. 7-098762

[51] Int. Cl.[6] .................. B65H 75/14; H01B 12/00
[52] U.S. Cl. .................. 242/602.3; 174/125.1; 242/118.32; 242/610.4; 242/610.6; 242/430
[58] Field of Search .................. 242/118.32, 430, 242/602.3, 610.4, 610.6; 156/425; 174/125.1

[56] References Cited

U.S. PATENT DOCUMENTS

| | | | |
|---|---|---|---|
| 3,559,126 | 1/1971 | Drautman, Jr. | 174/125.1 X |
| 4,694,268 | 9/1987 | Kawamura et al. | 174/125.1 X |
| 4,763,404 | 8/1988 | Coffey et al. | 174/125.1 X |
| 4,808,954 | 2/1989 | Ito | 174/125.1 X |
| 5,276,281 | 1/1994 | Sato et al. | 174/125.1 X |
| 5,384,197 | 1/1995 | Koyama et al. | 174/125.1 X |

*Primary Examiner*—Michael Mansen
*Attorney, Agent, or Firm*—Foley & Lardner

[57] ABSTRACT

A bobbin for superconducting coils, which is made of a fiber-reinforced plastic material containing: (1) a matrix resin; (2) a polyethylene fiber having a negative thermal expansion coefficient in the fiber lengthwise direction, the angle between the polyethylene fiber and the longitudinal axis of the bobbin being in the range of ±35° to 90°; and (3) a substance having an elastic modulus higher than that of the polyethylene fiber. The bobbin of the present invention is useful for superconducting coils because it only exhibits a quite low degree of deformation, even when used under external stress at cryogenic temperatures.

22 Claims, 7 Drawing Sheets

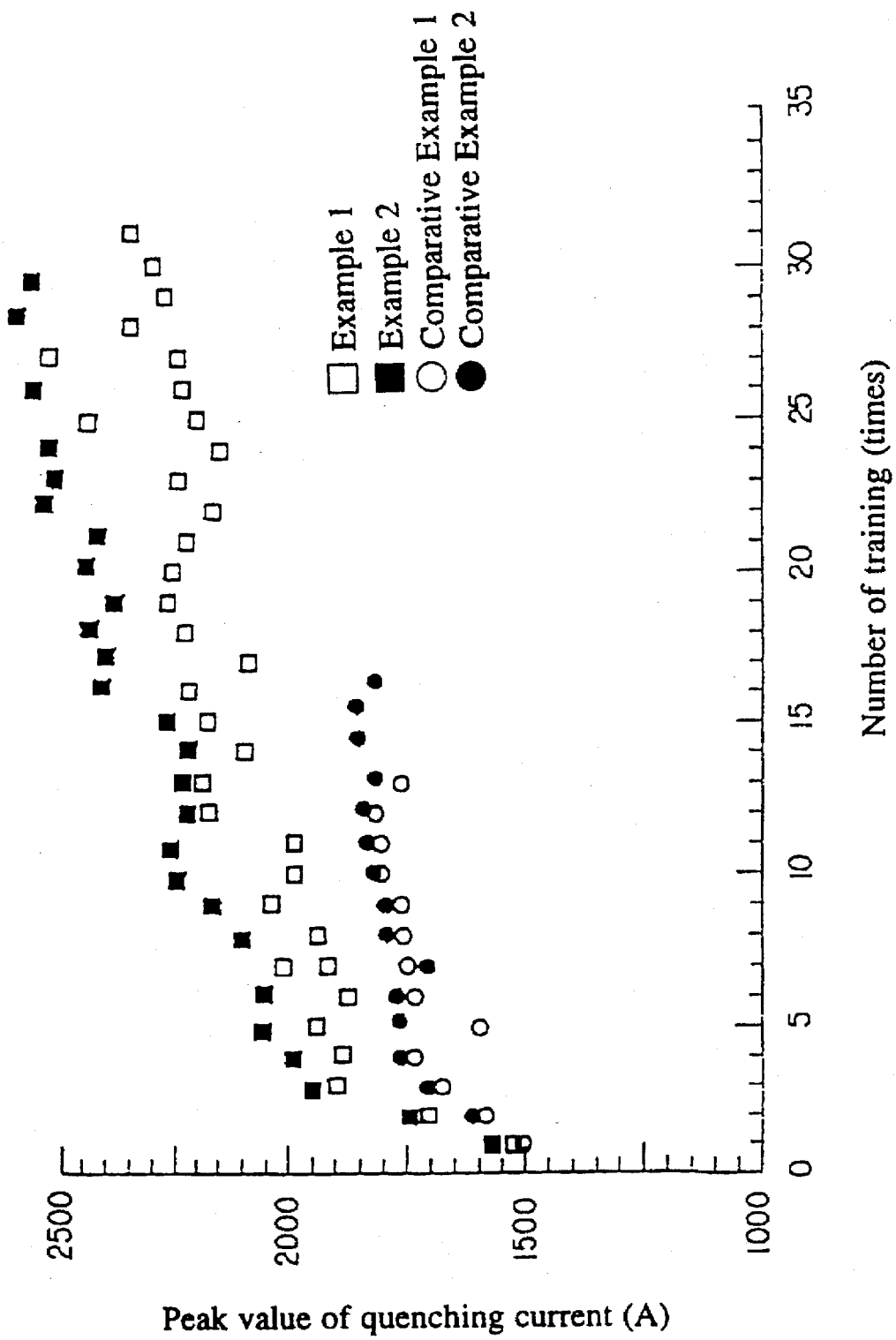

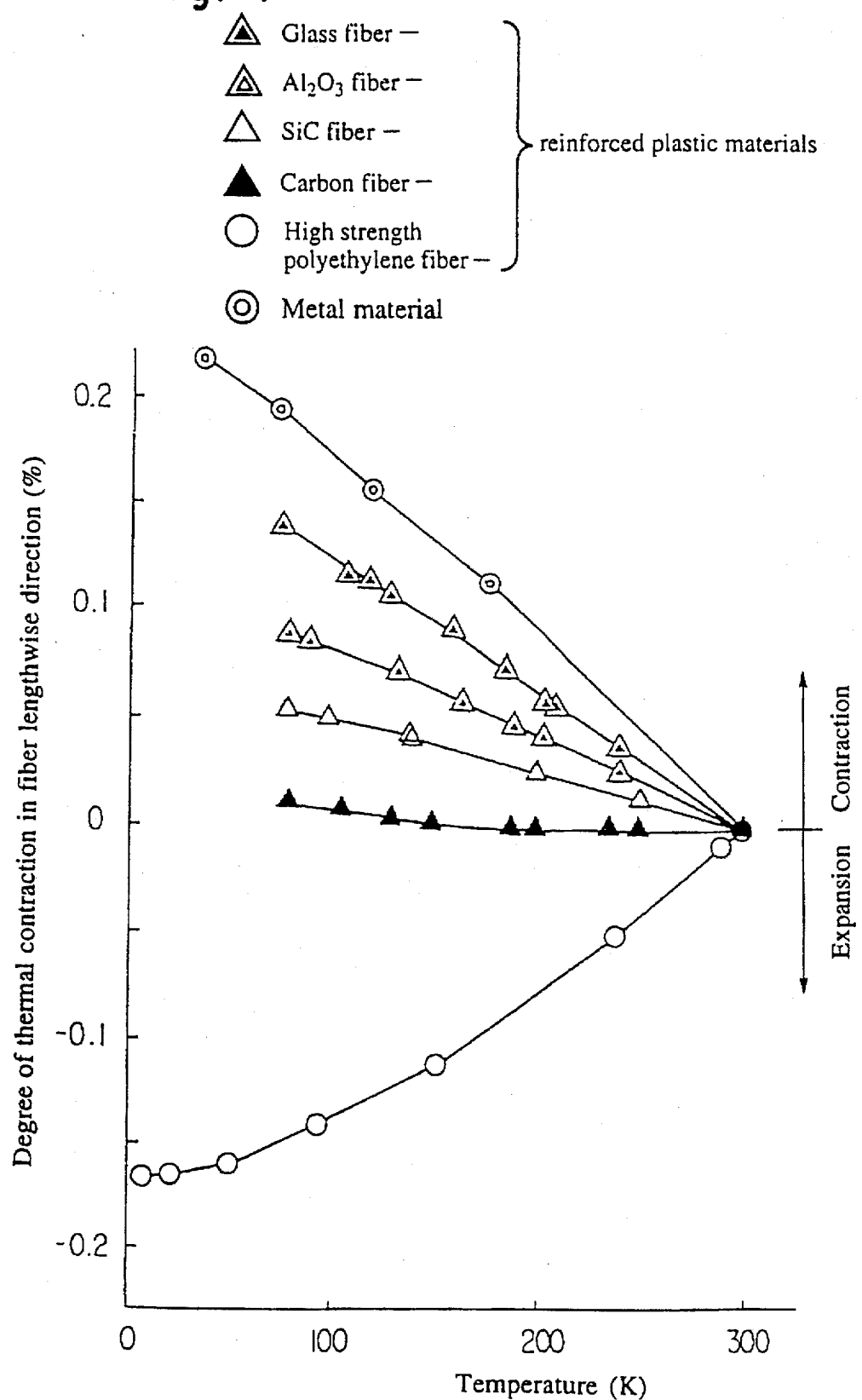

BOBBIN FOR SUPERCONDUCTING COILS

FIELD OF THE INVENTION

The present invention relates to a bobbin for superconducting coils. More particularly, it relates to a bobbin for superconducting coils, which is made of a fiber-reinforced plastic material (hereinafter abbreviated to "FRP").

BACKGROUND OF THE INVENTION

Superconducting coil devices are roughly classified by structure into several types. A typical example thereof is a device with a bobbin for the superconducting coil. Such a superconducting coil device is often used under a high flow of electric current. As the superconducting coil devices of this type, there have been known a device in which a superconducting coil is formed by winding a superconductor directly on the periphery of a bobbin; and a device in which a superconducting coil is formed by making plural layers of a wound superconductor with a spacer interposed between two adjacent layers on the periphery of a bobbin. For the superconducting coil devices used under alternating or pulsed electric current, a bobbin is usually made of a glass fiber-reinforced plastic material (hereinafter abbreviated to "GFRP") with an epoxy resin as the matrix to prevent the generation of eddy current in the bobbin.

These superconducting coil devices are used as they are entirely immersed in a cryogenic liquid such as liquid helium to keep a superconductor in the superconducting coil at a temperature lower than the superconducting transition temperature of this superconductor.

However, the conventional superconducting coil device with a GFRP bobbin has the following disadvantage.

When superconducting coil device 4 having superconductor 2 wound onto GFRP bobbin 1 to form superconducting coil 3, as shown in FIG. 3a, is immersed in a cryogenic liquid, bobbin 1 contracts both in the axial direction and in the circumferential direction, as shown by thick arrows A and B in FIG. 3a, respectively. This is because the glass fiber and the epoxy resin, both of which constitute bobbin 1, have positive thermal expansion coefficients.

On the other hand, superconductor 2 in the superconducting coil 3 is formed from a metal material having a positive thermal expansion coefficient. Therefore, superconducting coil 3 contracts both in the axial direction and in the circumferential direction, as shown by thick arrows C and D in FIG. 3a, respectively.

Thus, in the superconducting coil device 4 only immersed in a cryogenic liquid, bobbin 1 and superconducting coil 3 exhibit thermal contraction in the same direction substantially to the same degree, and no looseness can occur in the combination of these elements.

However, if electric current is allowed to pass through the superconducting coil 3 cooled at cryogenic temperatures, superconducting coil 3 exhibits an increased degree of contraction in the axial direction, but expansion in the circumferential direction by electromagnetic force generated from this electric current, as shown by thick arrows C' and E in FIG. 3b, respectively. Thus, there occurs looseness in the combination of bobbin 1 and superconducting coil 3, which leads to the tendency for the whole or part of superconducting coil 3 to readily move during the operating of electric current. The movement of superconducting coil 3, even if slight, is accompanied by generation of frictional heat. In general, cryogenic liquids such as liquid helium have quite small specific heat; therefore, it becomes difficult to have the frictional heat quickly absorbed by the cryogenic liquid and consequently superconductor 2 causes a transition from the superconducting state to the normal state (such a transition is usually called "quenching").

To solve this problem, some attempts have been recently made to form a bobbin from a fiber-reinforced plastic material containing a high strength polyethylene fiber (hereinafter abbreviated to "DF") as the reinforcing fiber (such a plastic material will hereinafter be abbreviated to "DFRP").

High strength polyethylene fibers have the peculiar property of expanding in the fiber lengthwise direction with a temperature fall, which is different from the case of ordinary glass fibers or ceramic fibers. In other words, FRP-formed products containing DF as the reinforcing fiber (i.e., DFRP-formed products) have negative thermal expansion coefficients in the fiber lengthwise direction, as shown by open single circles (○) in FIG. 4. In contrast, other FRP-formed products containing, as the reinforcing fiber, glass, alumina, silicon carbide or carbon fibers, and also a certain metal material itself, have positive thermal expansion coefficients in the fiber lengthwise direction, as shown by open triangles with inner solid triangles (▲), open double triangles (▲), open single triangles (△), solid triangles (▲) and open double circles (◎) in FIG. 4, respectively.

In the case where a roving strand of DF is wound onto a rotating mandrel, for example, by the helical winding method, while being impregnated with an epoxy resin as the matrix, to make cylindrical DFRP-formed product 5 as shown in FIG. 5a, a dimensional change with a temperature in the DFRP-formed product 5 depends, both in the axial direction and in the circumferential direction, upon the winding angle θ which is defined as an angle between the roving strand and the longitudinal axis of the mandrel (and hence the finished bobbin) as shown in FIG. 5b (where 0°≦|θ|≦90° and the sign of θ is plus (+) or minus (−), for example, when measured in the clockwise or counterclockwise direction, respectively, from the longitudinal axis of the mandrel toward the roving strand; in the helical winding method, the roving strand is helically wound onto the rotating mandrel from end to end, for example, at the winding angle θ of 75° and then wound in the opposite direction at the winding angle θ of −75°, followed by the winding repeated many times, and such a winding is usually designated by the phrase "±75° winding" or "wound at the winding angle θ of ±75°").

FIG. 6 shows the relationships between the dimensional change (thermal expansion coefficient) and the winding angle θ. These data were obtained from various FRP-formed products having a cylindrical shape as shown in FIG. 5a and containing a roving strand wound by the helical winding method as shown in FIG. 5b. In FIG. 6, curves denoted by "Xa" and "Xc" represent the thermal expansion coefficients of DFRP-formed products in the axial direction and in the circumferential direction, respectively. The thermal expansion coefficients of GFRP-formed products in the axial direction and in the circumferential direction are also shown in FIG. 6 as the curves denoted by "Za" and "Zc", respectively. Further, the thermal expansion coefficients of ADFRP-formed products (containing a combination of AF and DF in the volume ratio of 50:50 as the reinforcing fiber) in the axial direction and in the circumferential direction are shown in FIG. 6 as the curves denoted by "Ya" and "Yc", respectively. As used herein, the terms "AF" and "ADFRP" refer to a high tensile alumina fiber and a fiber-reinforced plastic material containing a combination of AF and DF as the reinforcing fiber, respectively.

As can be seen from FIG. 6, the thermal expansion coefficient of a DFRP-formed product takes small positive values to large negative values in the circumferential direction but small negative values to large positive values in the axial direction over the range of about 40° to 90° for the winding angle θ because of the DF characteristics even if the matrix used therein has a positive thermal expansion coefficient. Thus, DFRP-formed products with the winding angle θ set in the above range exhibit large expansion in the circumferential direction and large contraction in the axial direction with a temperature fall.

In contrast, GFRP-formed products have positive thermal expansion coefficients both in the axial direction and in the circumferential direction at any value of winding angle θ because GF itself has a positive thermal expansion coefficient in any direction. Thus, GFRP-formed products cannot have the same characteristics as those of the DFRP-formed products.

If the above-described characteristics of the DFRP-formed product are effectively utilized to form a bobbin from this DFRP-formed product, the bobbin thus obtained can exhibit ideal characteristics for preventing the occurrence of quenching.

That is, when superconducting coil device 14 with superconducting coil 13 formed by winding superconductor 12 onto DFRP bobbin 11 with the winding angle θ set in the above range is immersed in a cryogenic liquid, bobbin 11 contracts in the axial direction and expands in the circumferential direction, as shown by thick arrow J and K in FIG. 7a, respectively. On the other hand, superconducting coil 13 contracts both in the axial direction and in the circumferential direction, as shown by thick arrows C and D in FIG. 7a, respectively.

Thus, bobbin 11 and superconducting coil 13 expand or contract oppositely in the circumferential direction. Therefore, under the immersion in a cryogenic liquid, the intensity of combination between bobbin 11 and superconducting coil 13 is greatly enhanced. If electric current is allowed to pass through the superconducting coil 13 cooled at cryogenic temperatures, superconducting coil 3 exhibits an increased degree of contraction in the axial direction, but expansion in the circumferential direction by electromagnetic force generated from this electric current, as shown by thick arrows C' and E in FIG. 7b, respectively. Thus, bobbin 1 and superconducting coil 3 exhibit thermal expansion in the same direction substantially to the same degree, and there occurs no movement of superconductor 12, which makes it possible to prevent the occurrence of quenching caused by the movement of superconductor 12.

However, superconducting coil devices with bobbins made only of DFRP still have the following disadvantage.

As an application example of superconducting coil devices, the following will describe the case where the device is applied to a superconducting fault current limiter as disclosed in JP-A 2-168525/1990. The superconducting fault current limiter effectively utilizes the quenching of a superconductor. In this device, a superconductor wound onto the periphery of a bobbin by non-inductive winding is used as a current limiting element. The current limiting element is connected in series to a track. When track current flowing in the current limiting element exceeds the critical current of the superconductor, the superconductor in the current limiting element is quenched. The function as the fault current limiter is exhibited by a drastic increase in the resistance value of the superconductor, which is accompanied with this quenching.

Thus, when a superconducting coil device is applied to a superconducting fault current limiter, the superconductor becomes a resistor the moment quenching occurs, resulting in the generation of a great quantity of Joule's heat determined by the resistance value and the flowing current intensity. Due to this Joule's heat, the cryogenic liquid used, such as liquid helium, is suddenly evaporated to produce a high pressure gas region around the bobbin. The pressure of this region reaches 10 kg/cm$^2$ locally and acts as large external stress to the bobbin.

The elastic modulus of DFRP is not enough to withstand such an increase in pressure when the electric current is limited at the quenching. Therefore, a DFRP bobbin causes an elastic deformation when received large external stress as described above. The elastic deformation of the bobbin leads to the position shift of the superconductor from the previous stable position at the time of this deformation. As a result, when the superconductor is changed to the superconducting state and then electric current is allowed to flow again therein, it is liable to move to another stable position. The movement of the superconductor results in the generation of frictional heat as described above, which is responsible for the quenching of the superconductor. This phenomenon occurs repeatedly and hence it follows that the value of electric current capable of flowing in the current limiting element, i.e., rated current value for the current limiting element, is inevitably kept down.

Thus, a superconducting coil device with a bobbin made only of DFRP has the disadvantage that it cannot effectively utilize the quenching preventive function of the DFRP bobbin when used for applications in which large external stress is exerted on the bobbin, such as superconducting fault current limiter, because DFRP has a small elastic modulus.

As described above, there has been a serious problem that bobbins made of GFRP or DFRP cannot essentially avoid the instability of a superconducting coil.

SUMMARY OF THE INVENTION

Under these circumstances, the present inventors have intensively studied to develop a bobbin for superconducting coils, which can solve the above problems in the prior art. As a result, they have found that such a bobbin can be obtained by the use of a fiber-reinforced plastic material which contains a polyethylene fiber having a negative thermal expansion coefficient in the fiber lengthwise direction and a substance having an elastic modulus higher than that of the polyethylene fiber, thereby completing the present invention.

Thus, the present invention provides a bobbin for superconducting coils, which is made of a fiber-reinforced plastic material comprising: (1) a matrix resin; (2) a polyethylene fiber having a negative thermal expansion coefficient in the fiber lengthwise direction, the angle between the polyethylene fiber and the longitudinal axis of the bobbin being in the range of ±35° to 90°; and (3) a substance having an elastic modulus higher than that of the polyethylene fiber.

The bobbin for superconducting coils according to the present invention can find many applications, such as permanent current switches, alternating current magnets and pulsed current magnets, in which the use of metal materials is avoided for preventing the generation of eddy current or in which the stability of a superconducting coil is greatly required by the use of Cu—Ni as the matrix of the superconductor.

BRIEF DESCRIPTION OF THE DRAWINGS

FIG. 1b is a schematic view of the transverse section of the device, taken along line 1(b)—1(b) in FIG. 1a.

FIG. 2 is a graph showing the quenching characteristics (improved peak value of quenching current with an increase in the number of training) of superconducting coil devices produced in Examples 1–2 and Comparative Examples 1–2.

FIG. 4 is a graph showing the degree of thermal contraction with respect to various FRP-formed products containing a high strength polyethylene fiber or other fibers. This graph further shows the data of a certain metal material itself.

FIG. 5b is a partially broken view for the definition of winding angle θ in the preparation of a formed product as shown in FIG. 5a. In FIG. 5b, a mandrel is rotated in the counterclockwise direction when viewed from the top toward the bottom of this figure and a roving strand is wound in the same direction onto the mandrel by the helical winding method.

DETAILED DESCRIPTION OF THE INVENTION

The fiber-reinforced plastic material used in the present invention contains a roving strand, unidirectional fiber sheet, fabric sheet or the like of a polyethylene fiber having a negative thermal expansion coefficient in the fiber lengthwise direction, together with a substance having an elastic modulus higher than that of the polyethylene fiber (such a substance will hereinafter be abbreviated to "HMA"). In such a fiber-reinforced plastic material, the angle between the polyethylene fiber and the longitudinal axis of the bobbin, i.e., winding angle θ, is set in the range specified below.

The form of HMA may be selected from the group consisting of filaments, short fibers and particles. Examples of HMA are alumina, carbon, silica, zirconia, silicon carbide, titania and silicon nitride. Preferred is a high tensile alumina fiber and more preferred is an alumina fiber having a strength of at least 1200 MPa and an elastic modulus of at least 120 GPa.

In the case where alumina short fibers or particles are used as HMA, DF may be formed into an unidirectional fiber sheet or fabric sheet, which is then impregnated with a matrix resin containing the alumina short fibers or particles and wound in cylindrical shape about the longitudinal axis of the bobbin.

In the case where a high tensile alumina fiber, i.e., AF, is used as HMA, DF and AF may be in the form of a roving strand impregnated with the matrix resin and then wound about the longitudinal axis of the bobbin. The combination of DF and AF can be achieved by any method, for example, by winding a roving strand previously prepared from DF and AF mixed in a filament unit or in a yarn unit, or by alternately winding individual roving strands of DF and AF to form alternate layers of these roving strands.

The mixing ratio of AF to DF in the roving strand may be in the range of 5:95 to 75:25, preferably 10:90 to 65:35 for the purpose of exhibiting the characteristics of AF and DF to the greatest extent.

Figure 6:
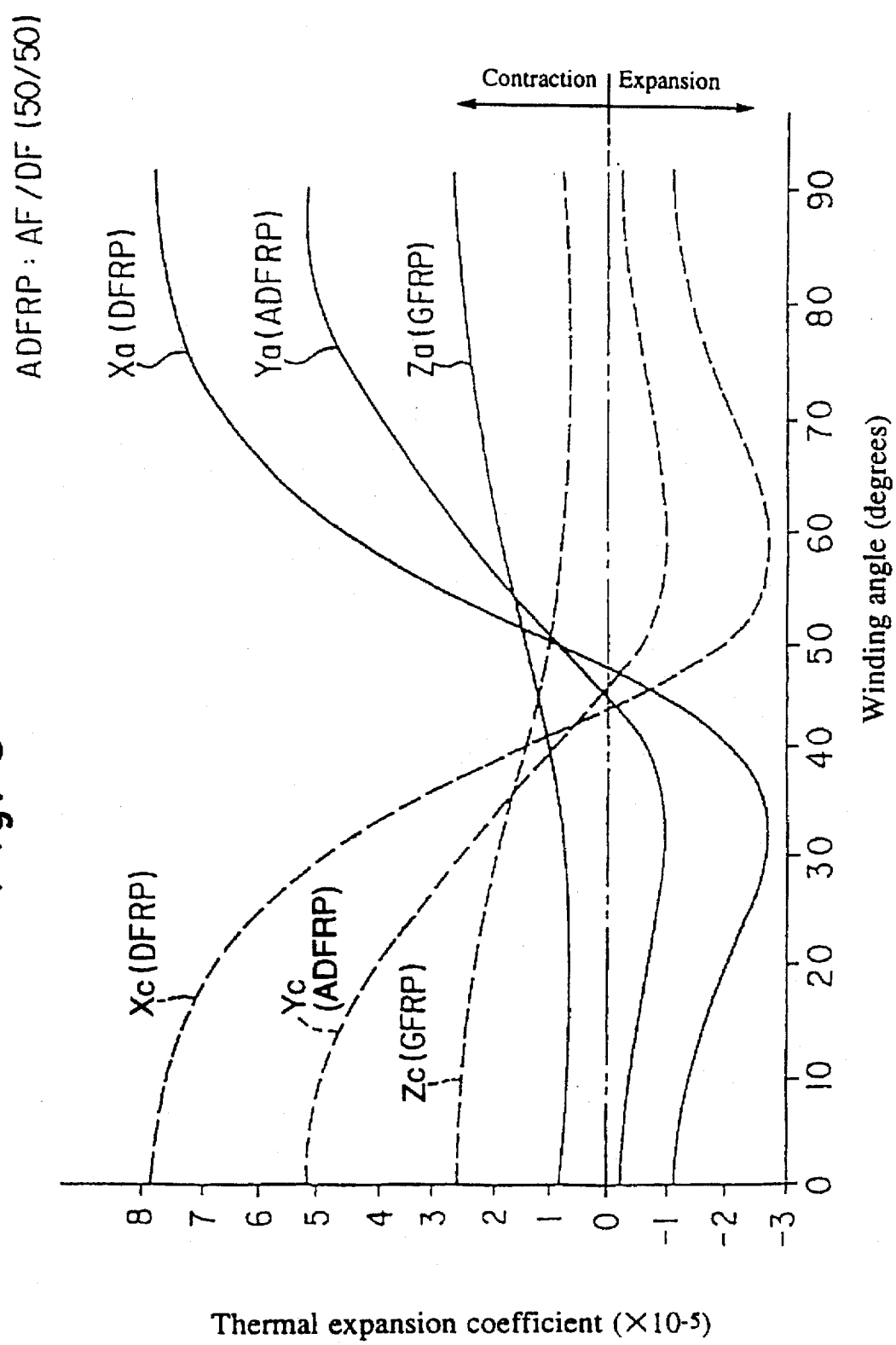
FIG. 6 is a graph showing the relationship between the thermal expansion coefficient and the winding angle θ in the ADFRP-, DFRP- or GFRP-formed products.
Figure 7A:
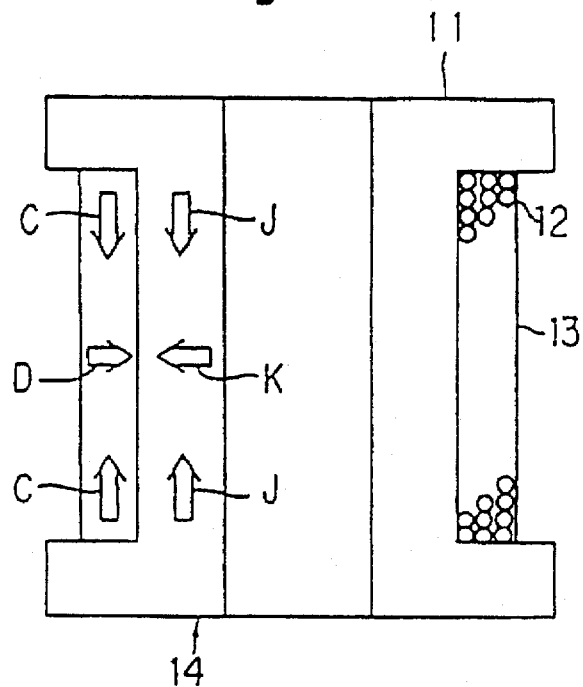
FIGS. 7a and 7b are schematic views for the explanation of an action at cryogenic temperatures of a superconducting coil device with a bobbin made of DFRP before and after the application of an electric current, respectively.
Figure 7B:
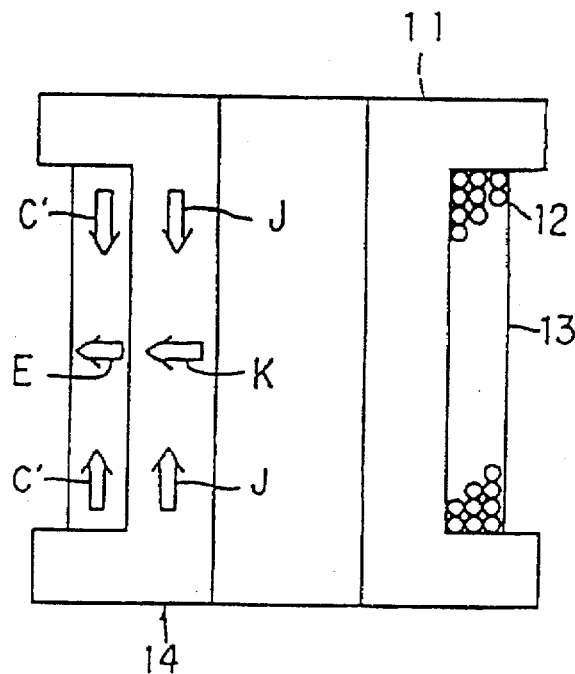

As can be seen from FIG. 6, it is important that the roving strand of DF and AF, or at least DF, is wound about the longitudinal axis of the bobbin at the winding angle θ in the range of ±35° to 90°, preferably ±43° to 90°, and more preferably ±80° to 90°.

The method for winding a roving strand onto a rotating mandrel (and hence about the longitudinal axis of the bobbin) is not particularly limited, and the roving strand can be wound by the conventional helical winding method in which the winding angle θ is constant in the range of ±35° to 90° except on both ends of the mandrel.

The roving strand may be impregnated with a matrix resin just before being wound onto the mandrel (wet winding) or may be preimpregnated with a partially cured matrix resin (dry winding). The positioning of the roving strand may be achieved for example, by a feeder arm located in front of the rotating mandrel. The feeder arm is reciprocated parallel to the longitudinal axis of the mandrel over the length of the mandrel at a constant speed.

Once the winding process is finished, the whole fixture is cured in an oven, and the mandrel is then removed. The cylindrically formed product thus obtained is mechanically processed to form flanges on both ends, resulting in a bobbin for superconducting coils.

The preparation of DF is not particularly limited, and DF can be obtained from commercial sources or can be produced by any process known in the art, for example, as described in JP-A 56-15408/1981 or JP-A 58-5228/1983. For example, a plastic high molecular weight polyethylene having a weight-average molecular weight of at least 100,000, preferably at least 1,000,000, is dissolved in decalin to give a spinning solution, which is extruded from a spinning nozzle in air or in water and cooled to form a decalin-containing gel fiber. The gel fiber is then drawn at a total draw ratio of 30 to 40 by single-step or multi-step drawing to give the desired DF. The DF thus obtained has a strength of at least 1.32 GPa and an elastic modulus of at least 23.9 GPa.

As described above, DF has the peculiar property of expanding in the fiber lengthwise direction with a temperature fall, which is different from the case of ordinary glass fibers or ceramic fibers. On the other hand, for example, AF has a very high elastic modulus as compared with GF and DF.

The material of AF may be any of high purity $Al_2O_3$ (99.5 wt % or higher purity; alumina with α-type crystal structure), $Al_2O_3$—$SiO_2$ (80–85 wt % purity; alumina with γ- or δ-type crystal structure) and $Al_2O_3$—$B_2O_3$ (80–85 wt % purity). For obtaining the quite excellent characteristics of a bobbin, high purity $Al_2O_3$ with α-type crystal structure is preferably employed. From the viewpoint of handling, $Al_2O_3$—$SiO_2$ with γ- or δ-type crystal structure is preferred.

The fiber of alumina with α-type crystal structure has a strength of at least 1500 MPa, preferably at least 1800 MPa, and an elastic modulus of at least 300 GPa, preferably at least 330 GPa. The fiber of alumina with γ-type crystal structure has a strength of at least 1500 MPa, preferably at least 1800 MPa, and an elastic modulus of at least 200 GPa, preferably at least 210 GPa. The fiber of alumina with δ-type crystal structure has a strength of at least 1300 MPa, preferably at least 1600 MPa, and an elastic modulus of at least 150 GPa, preferably at least 160 GPa.

A preferred bobbin is made of a fiber-reinforced plastic material containing a roving strand of DF and AF in a matrix as described above. Accordingly, such a bobbin has the property of AFRP which is hard to undergo a strain caused by external stress because of its high elastic modulus, while holding the excellent characteristics of DFRP which expands in the circumferential direction when cooled to cryogenic temperatures. Thus, the bobbin can exhibit the particularly satisfactory function of preventing the occurrence of quenching, even when used under external stress at cryogenic temperatures.

Examples of the matrix resin are epoxy resins, urethane resins, unsaturated polyester resins, vinyl ester resins and urethane acrylate resins. Most preferred are epoxy resins.

The fiber volume fraction (Vf) of the bobbin is preferably 25% to 85%, more preferably 35% to 75%.

The bobbin obtained under the above conditions may have a circumferential elastic modulus of at least 20 GPa, preferably at least 30 GPa, and more preferably at least 35 GPa. This means that the present invention makes it possible to obtain high elastic bobbins for superconducting coils.

The bobbin is preferably provided on the periphery with a spiral groove for holding a superconductor to be wound onto the bobbin and/or a longitudinal flow channel for guiding a cryogenic liquid to cool the superconductor.

The present invention will be further illustrated by the following examples.

Figure 1A:
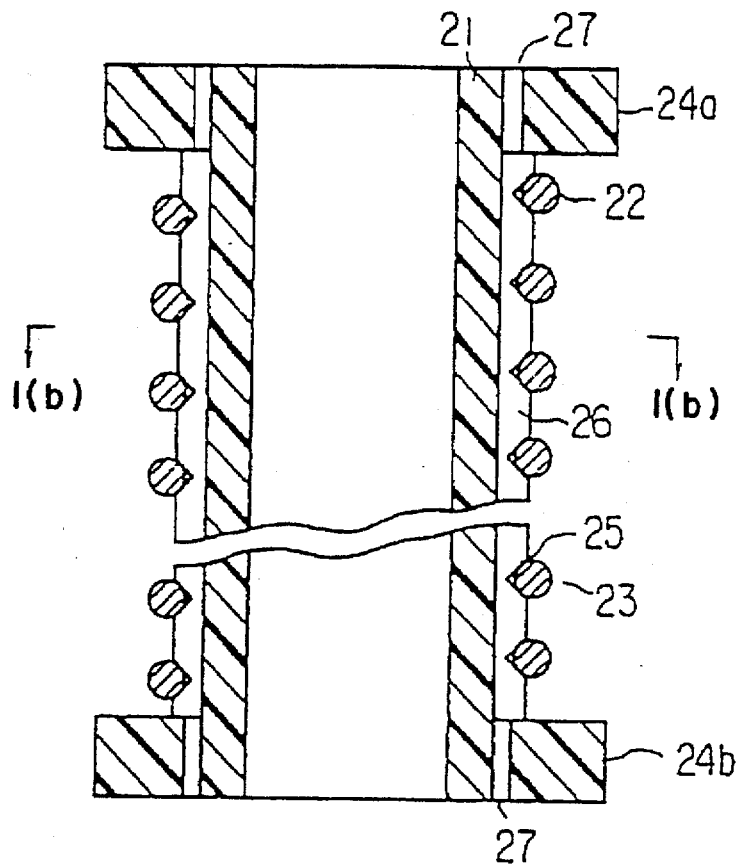
FIG. 1a is a schematic view showing the longitudinal, partially broken, section of a typical superconducting coil device with a bobbin of the present invention.
Figure 1B:
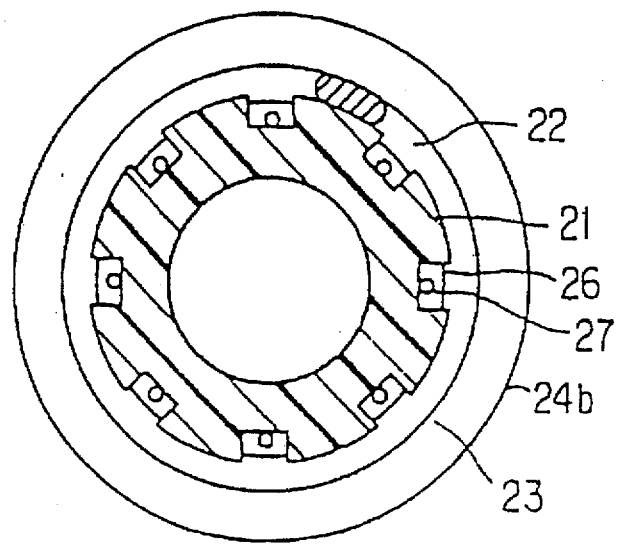
Figure 3A:
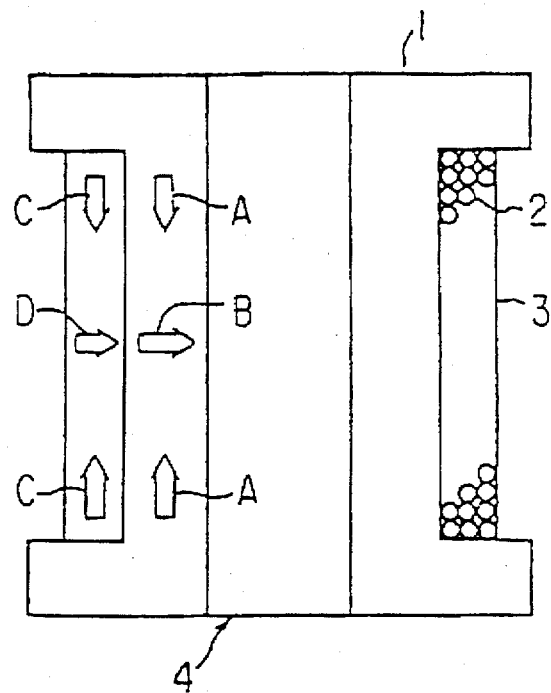
FIGS. 3a and 3b are schematic views for the explanation of a problem at cryogenic temperatures in the superconducting coil device with a conventional bobbin made of GFRP before and after the application of an electric current, respectively.
Figure 3B:
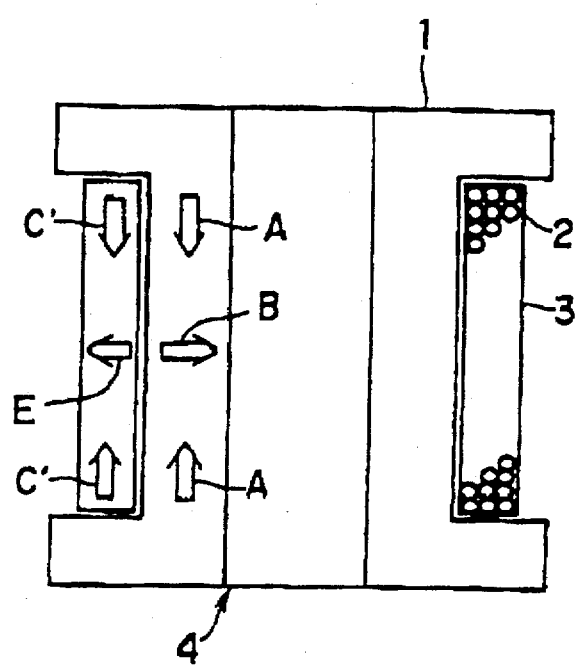

FIGS. 1a and 1b show a superconducting coil device with a bobbin of the present invention. This superconducting coil device is composed mainly of bobbin 21 and superconducting coil 23 formed by winding superconductor 22 onto bobbin 21.

The bobbin 21 is made of a cylindrical ADFRP-formed product which has been prepared by winding a roving strand of DF and AF onto a rotating mandrel while impregnating with an epoxy resin as the matrix. The bobbin 21 has flanges 24a and 24b on both ends and further has spiral groove 25, as well as plural longitudinal flow channels 26 each having a greater depth than that of spiral groove 25 and each running in the axial direction, on the periphery of the core portion positioned between flanges 24a and 24b. In addition, plural holes 27 each communicating with the ends of the corresponding longitudinal flow channel 26 are formed through flanges 24a and 24b.

The superconductor 22 is wound in solenoid shape under a constant tension for partial fitting into spiral groove 25, as shown in FIG. 1a.

In Examples 1–2 and Comparative Examples 1–2 below, the circumferential thermal strain over the range of room temperature to liquid nitrogen temperature and circumferential elastic modulus of cylindrically formed products (and hence bobbin 21) are measured as follows:

1. Circumferential thermal strain

A strain gauge is attached to the periphery of a product and then connected to a bridge box and a recorder. This product is immersed in liquid nitrogen and allowed to reach the equilibrium, at which the value of thermal strain is read on the recorder.

2. Circumferential elastic modulus (or Young's modulus in the circumferential direction)

A plate made of an unidirectional fiber reinforced plastic material (hereinafter abbreviated to "UD-FRP") is prepared under the same conditions (i.e., kinds of matrix resin, DF and HMA, mixing ratio of HMA to DF, fiber volume fraction, and the like) as those used in the production of a cylindrically formed product, and this plate is examined at room temperature with a tensile testing machine for Young's modulus in the fiber lengthwise direction ($E_L$), Young's modulus in the fiber transverse direction ($E_T$) and shear modulus ($G_{LT}$) as well as Poisson's ratio in the fiber lengthwise direction ($\nu_L$) and Poisson's ratio in the fiber transverse direction ($\nu_T$). The value of circumferential elastic modulus or Young's modulus in the circumferential direction ($E_y$) of the cylindrically formed product is calculated by putting these measured values in the following equation:

$$1/\underline{E}_y = 1/E_y - \psi^2 G_{xy}$$

$$1/E_y = m^4/E_L + l^4/E_T + (1/G_{LT} - 2\nu_L/E_L) l^2 m^2$$

$$1/G_{xy} = 4[(1+\nu_L)/E_L + (1+\nu_T)/E_T] l^2 m^2 + (l^2 - m^2)^2 / G_{LT}$$

$$\psi = 2[l^2/E_T - m^2/E_L + (1/G_{LT} - 2\nu_L/E_L)(l^2 - m^2)/2] lm$$

$$l = \cos \theta$$

$$m = \sin \theta$$

where $G_{xy}$ is the shear modulus of the cylindrically formed product and $\theta$ is the winding angle, as described in M. Uemura, J. Ppn. Soc. Aero. Space Sci., 24, 496(1976).

The following are typical examples of such a bobbin.

EXAMPLE 1

Figure 5A:
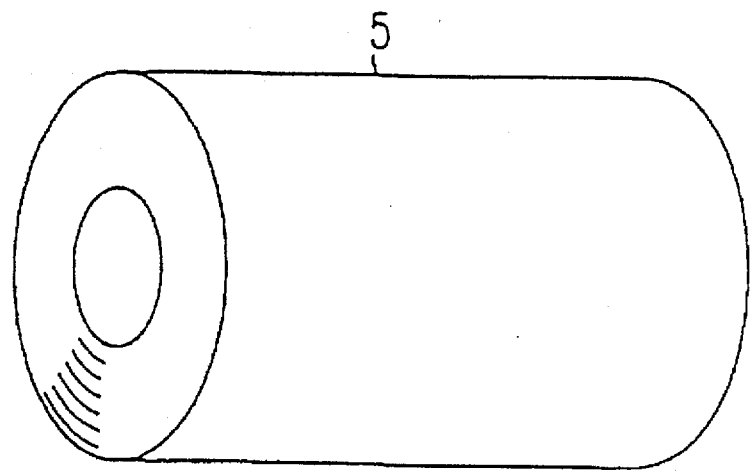
FIG. 5a is a perspective view showing the shape of a DFRP- or ADFRP-formed product obtained in Examples 1–2 and Comparative Examples 1–2.
Figure 5B:
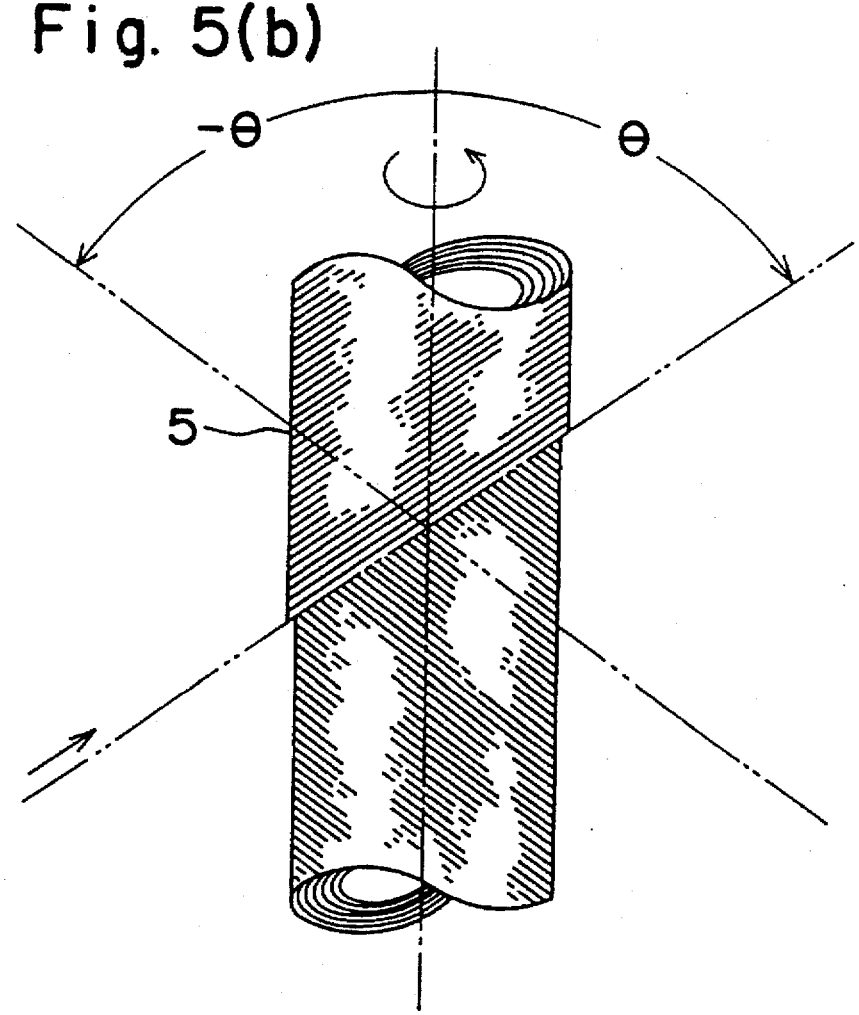

A roving strand was prepared as the reinforcing fiber for bobbin 21 made of ADFRP by mixing a high strength polyethylene fiber (Dyneema SK-60, Toyobo) and an alumina fiber in yarn units at the volume ratio of 40:60, and then wound onto a rotating mandrel at the winding angle $\theta$ of ±75° by the helical winding method, as shown in FIG. 5b, while being impregnated with an epoxy resin as the matrix. Thus, a fixture in cylindrical shape was obtained.

The whole fixture was cured by heating at 100° C. for 2 hours and then at 130° C. for 3 hours to give a cylindrical ADFRP-formed product, as shown in FIG. 5a. The fiber volume fraction (Vf) of this product (and hence bobbin 21) was 65%. Further, the circumferential thermal strain over the range of room temperature to liquid nitrogen temperature and circumferential elastic modulus of this product (and hence bobbin 21) were measured to be +700µε and 73 GPa, respectively.

The ADFRP-formed product was mechanically processed to form not only flanges 24a and 24b on both ends but also spiral groove 25 and plural longitudinal flow channels 26 each running in the axial direction on the periphery of the core portion positioned between flanges 24a and 24b. In addition, flanges 24a and 24b were provided with plural holes 27 each communicating with the ends of the corresponding longitudinal flow channel 26.

Thus, bobbin 21 was obtained, which had an inner diameter of 210 mm, an outer diameter of 220 mm and an axial length of 400 mm. Then, superconductor 22 of 2.5 mm in wire diameter was wound onto bobbin 21 under a constant tension so that it was held by partial fitting into spiral groove 25, resulting in a superconducting coil device.

EXAMPLE 2

A superconducting coil device was produced in the same manner as described in Example 1, except that the roving strand was wound at the winding angle $\theta$ of ±85°. The circumferential thermal strain over the range of room temperature to liquid nitrogen temperature and circumferential elastic modulus of the ADFRP-formed product (and hence bobbin 21) were measured to be +400 µε and 92 GPa, respectively.

COMPARATIVE EXAMPLE 1

A superconducting coil device was produced in the same manner as described in Example 1, except that DFRP was used as the fiber-reinforced plastic material and the roving strand of a high strength polyethylene fiber as used in Example 1 was wound at the winding angle θ of ±60°. The circumferential thermal strain over the range of room temperature to liquid nitrogen temperature and circumferential elastic modulus of the DFRP-formed product (and hence bobbin 21) were measured to be +2000 µε and 11 GPa, respectively.

COMPARATIVE EXAMPLE 2

A superconducting coil device was produced in the same manner as described in Example 1, except that the roving strand was wound at the winding angle θ of ±30°. The circumferential thermal strain over the range of room temperature to liquid nitrogen temperature and circumferential elastic modulus of the ADFRP-formed product (and hence bobbin 21) were measured to be −5400 µε and 11 GPa, respectively.

Experiments

Four superconducting coil devices thus obtained were respectively immersed in liquid helium, and the change of quenching current for each device was measured by the training method. The results are shown in FIG. 2.

In FIG. 2, open squares (□) and solid squares (■) denote the measured values for the devices of Example 1 (with an ADFRP bobbin by ±75° winding) and of Example 2 (with an ADFRP bobbin by ±85° winding), respectively, and open circles (○) and solid circles (●) denote the measured values for the devices of Comparative Example 1 (with a DFRP bobbin by ±60° winding) and of Comparative Example 2 (with a ADFRP bobbin by ±30° winding), respectively.

As can be seen from FIG. 2, the device of Comparative Example 1 with a DFRP bobbin only gave the flowing of electric current to the upper limit of not greater than 1800 A, even if the number of training was increased. The device of Comparative Example 2 also exhibited poor characteristics similar to those of Comparative Example 1.

In contrast, the device of Example 1 with an ADFRP bobbin made possible the flowing of electric current after about 30 times training, to the upper limit of 2400 A, which is about 30% higher than that of Comparative Example 1. This is because the elastic modulus of the bobbin was improved by the addition of an alumina fiber and hence the strain of the ADFRP bobbin caused by external stress was decreased to about half as little as that of the DFRP bobbin, whereby the superconductor became hard to move. Accordingly, even if ADFRP bobbins are used for applications in which large external stress is exerted on the bobbin at cryogenic temperatures, such as superconducting fault current limiter, the quenching preventive function similar to that of DFRP bobbins can be effectively utilized.

In Example 2, the flowing of electric current was allowed to the upper limit of 2600 A, which is still higher than that of Example 1. This seems to indicate that an increase in the value of winding angle θ (i.e., increase from ±75° to ±85°) led to an improvement in the bobbin rigidity and consequently to a higher level of coil stabilization.

Although not shown in any of the accompanying figures, it was verified that an ADFRP bobbin with the winding angle θ of about ±35° also exhibited good characteristics similar to those of Examples 1 and 2.

The present invention is not limited to the above examples where the whole bobbin including flanges was made of ADFRP. Taking account of workability, the surface of the core portion to be provided with spiral groove 25 and longitudinal flow channels 26 may be formed from AFRP or GFRP, and the inside thereof may be formed from ADFRP.

As described above, the bobbin of the present invention exhibits only a quite low degree of deformation, even when used under external stress at cryogenic temperatures, which makes possible steady holding of a superconducting coil and hence makes a contribution to the prevention of the occurrence of quenching. Therefore, the bobbin of the present invention can be useful for various applications including, but not limited to, superconducting fault current limiters.

What is claimed is:

1. A bobbin for superconducting coils, which is made of a fiber-reinforced plastic material, the bobbin comprising:
   (a) a matrix resin;
   (b) a polyethylene fiber having:
      a negative thermal expansion coefficient in a lengthwise direction of the fiber,
      a strength,
      an elastic modulus; and
      wherein an angle exists between the polyethylene fiber and a lengthwise axis of the bobbin, the angle being in the range of ±35° to 90°; and
   (c) a substance having an elastic modulus higher than the elastic modulus of the polyethylene fiber.

2. A bobbin according to claim 1, wherein the angle between the polyethylene fiber and the lengthwise axis of the bobbin is in the range of ±43° to 90°.

3. A bobbin according to claim 2, wherein the angle between the polyethylene fiber and the lengthwise axis of the bobbin is in the range of ±80° to 90°.

4. A bobbin according to claim 1, wherein the polyethylene fiber has a weight-average molecular weight of at least 100,000.

5. A bobbin according to claim 1, wherein the strength of the polyethylene fiber is at least 1.32 GPa and the elastic modulus of the polyethylene fiber is at least 23.9 GPa.

6. A bobbin according to claim 1, wherein the substance having an elastic modulus higher than that of the polyethylene fiber is an alumina fiber having a strength of at least 1200 MPa and the elastic modulus is at least 120 GPa.

7. A bobbin according to claim 6, wherein the alumina fiber is made of alumina with γ-type crystal structure and has a strength of at least 1500 MPa and an elastic modulus of at least 200 GPa.

8. A bobbin according to claim 6, wherein the alumina fiber is made of alumina with γ-type crystal structure and has a strength of at least 1500 MPa and an elastic modulus of at least 300 GPa.

9. A bobbin according to claim 6, wherein the alumina fiber is made of alumina with δ-type crystal structure and has a strength of at least 1300 MPa and an elastic modulus of 150 GPa.

10. A bobbin according to claim 6, wherein the polyethylene fiber and the alumina fiber are a roving strand impregnated with the matrix resin and then wound about the lengthwise axis of the bobbin.

11. A bobbin according to claim 10, wherein the roving stand is comprised of a mixing volume ratio of alumina fiber to polyethylene fiber, said mixing volume ratio being in the range of 5:95 to 75:25.

12. A bobbin according to claim 11, wherein the mixing volume ratio of alumina fiber to polyethylene fiber is in the range of 10:90 to 65:35.

13. A bobbin according to claim 1, wherein the substance having an elastic modulus higher than that of the polyethylene fiber is one of alumina short fibers and particles.

14. A bobbin according to claim 13, wherein the polyethylene fiber is formed into an unidirectional fiber sheet or fabric sheet impregnated with the matrix resin containing one of the alumina short fibers and particles and wound in cylindrical shape about the lengthwise axis of the bobbin.

15. A bobbin according to claim 1, wherein the matrix resin is selected from the group consisting of epoxy resins, urethane resins, unsaturated polyester resins, vinyl esters resins and urethane acrylate resins.

16. A bobbin according to claim 15, wherein the matrix resin is an epoxy resin.

17. A bobbin according to claim 1, wherein the bobbin further comprises a fiber volume fraction in the range of 0.25 to 0.85.

18. A bobbin according to claim 17, wherein the bobbin further comprises a fiber volume fraction in the range of 0.35 to 0.75.

19. A bobbin according to claim 1, which has a circumferential elastic modulus of at least 20 GPa.

20. A bobbin according to claim 19, which has a circumferential elastic modulus of at least 30 GPa.

21. A bobbin according to claim 1, wherein a spiral groove for holding a superconductor to be wound onto the bobbin is formed on a periphery of the bobbin.

22. A bobbin according to claim 1, wherein a lengthwise flow channel for guiding a cryogenic liquid to cool a superconductor to be wound onto the bobbin is formed on a periphery of the bobbin.

* * * * *